US008456031B1

(12) United States Patent
Hull et al.

(10) Patent No.: US 8,456,031 B1
(45) Date of Patent: Jun. 4, 2013

(54) UNDERWATER PUMPED-HYDRO ENERGY STORAGE

(75) Inventors: John R. Hull, Sammamish, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 12/577,852

(22) Filed: Oct. 13, 2009

(51) Int. Cl.
*F03B 13/00* (2006.01)
*H02P 9/04* (2006.01)

(52) U.S. Cl.
USPC .............................. 290/54; 290/43

(58) Field of Classification Search
USPC ............... 290/42, 43, 53, 54; 60/495, 497, 60/496, 501, 505, 398, 502, 698; 416/85; 417/333, 331
See application file for complete search history.

(56) References Cited

U.S. PATENT DOCUMENTS

| 3,992,881 A * | 11/1976 | Scherrer ..................... 60/398 |
| 4,091,618 A | 5/1978 | Jackson |
| 4,092,828 A | 6/1978 | Garza |
| 4,321,475 A * | 3/1982 | Grub .......................... 290/52 |
| 4,327,296 A * | 4/1982 | Weyers ....................... 290/53 |
| 4,398,095 A * | 8/1983 | Ono .............................. 290/53 |
| 4,454,429 A * | 6/1984 | Buonome .................... 290/53 |
| 5,225,728 A * | 7/1993 | Oshima .................... 310/90.5 |
| 5,894,181 A * | 4/1999 | Imlach ...................... 310/90.5 |
| 6,831,374 B2 * | 12/2004 | Seki .............................. 290/44 |
| 7,188,471 B2 | 3/2007 | Walters |
| 7,315,100 B2 * | 1/2008 | Chen et al. ................ 310/90.5 |
| 2009/0140523 A1 * | 6/2009 | DeAngeles ................. 290/43 |
| 2009/0140525 A1 * | 6/2009 | DeAngeles ................. 290/54 |
| 2010/0242826 A1 * | 9/2010 | Koivusaari et al. ......... 114/333 |

* cited by examiner

*Primary Examiner* — Julio Gonzalez
(74) *Attorney, Agent, or Firm* — Caven & Aghevli LLC

(57) ABSTRACT

Device and methods associated with underwater pumped-hydro energy storage are disclosed. An underwater pumped-hydro energy storage device includes a submersible tank that includes an inlet and an outlet. A pump is disposed at the outlet of the submersible tank to evacuate water from the submersible tank in a surrounding body of water. A valve is disposed at the inlet of the at least one submersible tank to control a flow of the water into the submersible tank from the surrounding body of water. Moreover, a turbine power unit is to generate output electrical power from the flow water into the submersible tank.

10 Claims, 6 Drawing Sheets

UNDERWATER PUMPED-HYDRO ENERGY STORAGE

TECHNICAL FIELD

The present disclosure relates to systems and methods for energy storage, and more specifically, to systems and methods for using pumped-hydro energy storage.

BACKGROUND

There is a general need for inexpensive energy storage for most electrical grids. Pumped-hydro energy storage is one of the least expensive methods of energy storage presently known. Pumped hydro-storage generally entails disbursing water from a higher elevation to a lower elevation when the production of electrical power is desired. The disbursed water may be provided to a turbine generator to generate electricity. Conversely, water may be pumped back to the higher elevation when the storage of energy is desired.

Some existing pumped-hydro energy storage may utilize an upper reservoir at the higher elevation and a lower reservoir at the lower elevation. These reservoirs may be connected by a pipe. When electrical power is needed from storage, water travels down the pipe and turns a turbine generation. Thus, in addition to possible inefficiency of the turbine and the pump, there may be frictional loss due to the passage of water through the pipe. In other existing pumped-hydro energy storage, the surface height of an upper reservoir may vary depending on the amount of water in the reservoir. Thus, a changing water height in the reservoir may result in changing hydrostatic pressure on the turbine generator, which may affect the efficiency of the turbine generator in producing electrical power.

Therefore, it would be advantageous to have a pumped-hydro energy storage apparatus and methods that do not have the one or more shortcomings described above.

SUMMARY

Systems and methods for underwater pumped-hydro energy storage are disclosed. These novel systems and methods enable the use of underwater pumped-hydro energy storage to provide an efficient and economical way for power utilities to store excessive electricity that are generated during low demand periods, as well as supplement electricity generation capacity for use during peak loads. Accordingly, power utilities may avoid the financial, social, and environmental costs associated with building new power generation power plants and support infrastructure.

In various embodiments, an underwater pumped-hydro energy storage device includes at least one submersible tank that includes an inlet and an outlet. A pump is disposed at the outlet of the submersible tank to evacuate water from the submersible tank into a surrounding body of water. A valve is disposed at the inlet of the at least one submersible tank to control a flow of the water into the submersible tank from the surrounding body of water. Moreover, a turbine power unit is positioned to generate output electrical power from the flow water into the submersible tank.

In other embodiments, a method of using an underwater pumped-hydro energy storage device comprises determining a power supply capacity of a power source and a load demand of a power user via an energy distribution computer. The method also includes detecting the status of at least one submersible tank of the underwater pumped-hydro energy storage device via one or more sensors. Accordingly, the method includes pumping water out of at least one submersible tank via a water pump to store energy when the load demand does not exceed the power supply capacity and the status of the at least one submersible tank is not empty. Alternatively, the method includes generating output electrical power by permitting water to flow into the at least one submersible tank through a turbine power unit when the load demand exceeds the power supply capacity and the status of the at least one submersible tank is not full.

In additional embodiments, a method for deploying an underwater pumped-hydro energy storage device includes providing at least one submersible tank with one or more water pumps. The method further includes providing the at least one water submersible tank with one or more turbine power units. Each of the turbine power generator includes one or more magnetic bearings that support weight of at least one of a shaft, a turbine, a rotor part of a generator, or water flowing on one or more turbine blades of a turbine in the turbine power units. The method additionally includes positioning the at least one submersible tank at a submerged location. The method also includes connecting the one or more water pumps and the one or more turbine power units to a power grid. In this way, the device may store electrical energy from the power grid or supply electrical energy to the power grid based on the power supply capacity and the power demand of the power grid.

The features, functions, and advantages that have been discussed above or will be discussed below can be achieved independently in various embodiments, or may be combined in yet other embodiments, further details of which can be seen with reference to the following description and drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Systems and methods in accordance with the present disclosure are directed to embodiments of underwater pumped-hydro energy storage. The underwater pumped-hydro energy storage units in accordance with the embodiments may be submerged almost anywhere in a body of water, as well as moved to different locations as desired. Thus, the embodiments of the underwater pumped-hydro energy storage units may make use of any natural or man-made body of water as a potential energy source. Since the amount of water in an entire ocean or a large lake is likely to remain constant, the embodiments of the underwater pumped-hydro energy storage units may be supplied with nearly constant water pressure heads. As a result, the one or more hydro turbine generators of each unit may be optimized for a specific application. For example, the blade pitch angles of the one or more hydro turbine generators on each unit may be set, or customized, to an optimal value to take full advantage of a particular hydrostatic pressure head. Thus, the embodiments of the underwater pumped-hydro energy storage units may provide an efficient and economical way for power utilities to store excessive electricity that are generated during low demand periods, as well as supplement electricity generation capacity for use during peak loads. Accordingly, power utilities may avoid the financial, social, and environmental costs associated with building new power generation plants and support infrastructures.

Many specific details of certain embodiments are set forth in the following description and in FIGS. 1-6 to provide a thorough understanding of such embodiments. The present disclosure may have additional embodiments, or may be practiced without one or more of the details described below.

Figure 1:
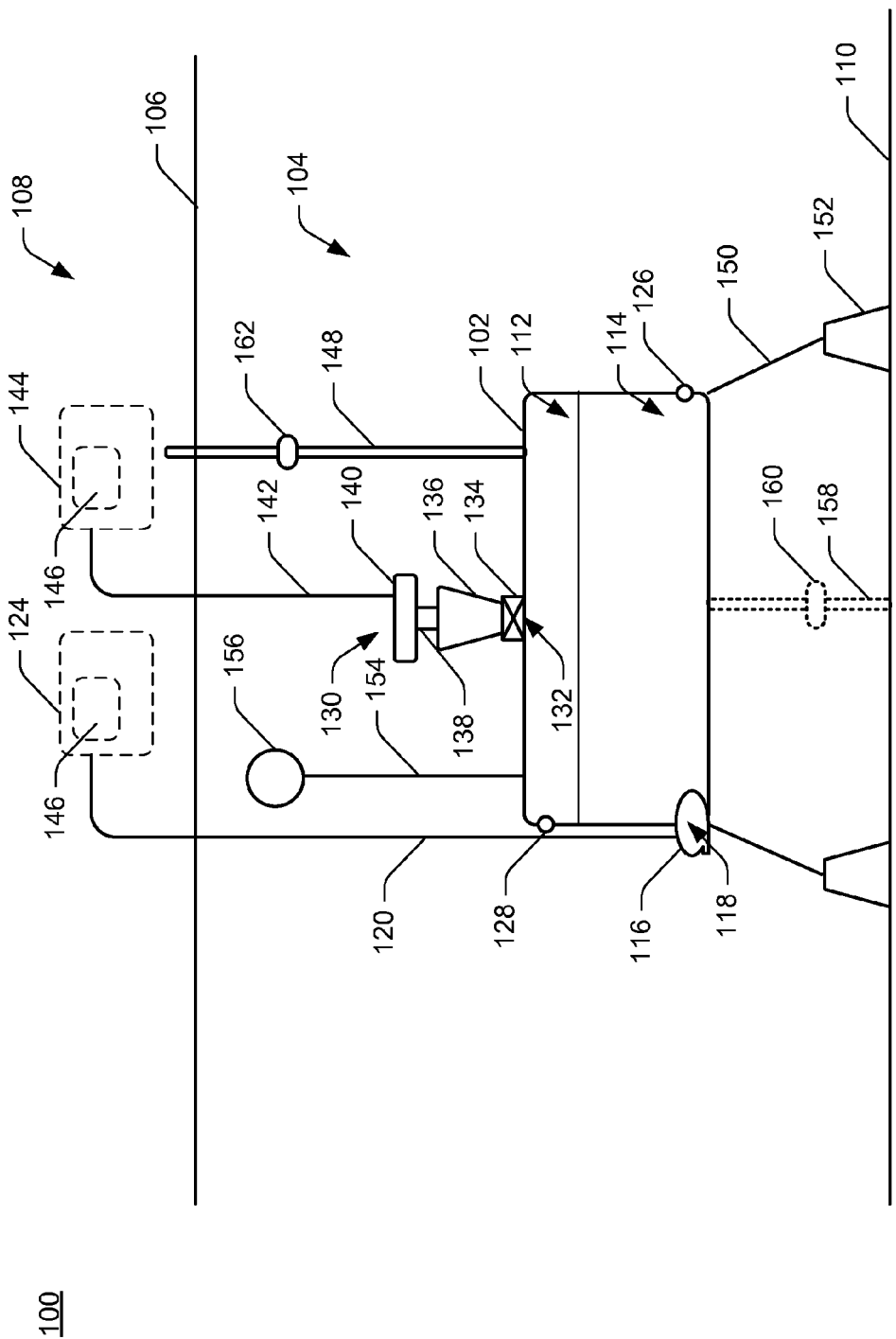
FIG. 1 is a side view of an example underwater pumped-hydro energy storage unit, in accordance with various embodiments.

FIG. 1 is a side view of an example underwater pumped-hydro energy storage unit 100, in accordance with various embodiments. The unit 100 may include a tank 102 that may be submerged into a body of water 104. The body of water 104 may have an upper water surface 106 that transitions to atmosphere 108, as well as a bottom 110. The tank 102 may be manufactured from various rigid materials. Such rigid materials may include, but is not limited to, steel, polymers, fiberglass, concrete, carbon-fiber reinforced plastic (CFRP), and the like. The tank 102 may be manufactured to a sufficient rigidity to withstand the hydrostatic pressure exerted at an operating depth by the surrounding body of water 104 without deformation. During operation, a gas portion 112 and a water portion 114 of varying volumes may be present in the tank 102.

The tank 102 may be equipped with a water pump 116 at an outlet 118. The water pump 116 may evacuate water from the tank 102. The water pump 116 may be powered by an electrical cable 120 that is connected to a power source 124. In some embodiments, the power source may be an electrical grid of an electrical utility, i.e., power plant. In other embodiments, the power source 124 may be a local power source, such as a floating wind power generator, a floating solar power generator, a wave power generator, etc.

The tank 102 may be further equipped with turbine power unit 130 at an inlet 132. The turbine power unit 130 may include a valve 134 that controls the flow of water into the tank 102 through a turbine 136. In turn, turbine 136 may be connected by a shaft 138 to an electrical generator 140. As shown in FIG. 1, the valve 134 may be located at an outlet of the turbine 136. However, the valve 134 may be alternatively located at an inlet of the turbine 136. In at least one embodiment, the valve 134 may be an electromechanical valve that is controlled by an electrical current (e.g., solenoid valve). In various embodiments, the blade pitch angles of turbine 136 may be pre-configured for a hydrostatic pressure at the depth of the submerged tank 102 to ensure maximum electrical output.

In some embodiments, the electrical power generated by the electrical generator 140 may be transmitted via an electrical cable 142 to an electrical grid of a power user 144. In at least one embodiment, the power user 144 may also be the power source 124, e.g., the same electrical utility that supplies power to the pump 116.

The power source 124 and/or the power user 144 may be equipped with an energy distribution computer 146. The energy distribution computer 146 may include one or more processors and memory suitable to store and execute computer-executable instructions. The memory may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology that may be used to store the desired information and which can be accessed by the one or more processors.

The memory may store computer instructions that automatically direct the unit 100 to store surplus power generated by the power source 124 in the unit 100, and return power to the power user 144 upon demand, such as during period when demand for electrical power exceeds the power production capacity of the power source 124.

In other embodiments, the energy distribution computer 146 at the power source 124 and/or the power user 144 may include a user interface that enables an operator to manually perform or override at least some of the tasks performed by the energy distribution computer 146. Accordingly, in some of these embodiments, the user interface of the energy distribution computer 146 may include displays that indicates the amount of generated electrical power, the amount of consumed electrical power, the fill status of tank 102, status of the valve 134 and pump 116, and/or other relevant sensor data. Further, the user interface of the energy distribution computer 146 may include one or more controls (e.g., keyboards, switches, touch screens, etc.) that enable an operator to control the electrical energy generation and distribution functions.

In operation, the volumes of the gas portion 112 and the water portion 114 in the tank 102 may expand and contract as water is alternatively pumped out of the tank 102 to store energy, or allowed to flow into the tank 102 to generate electrical power. However, in some embodiments, the tank 102 may be provided with a first level sensor 126 that ensures that at least some volume (e.g., 5% of tank volume) of water portion 114 remains in the tank 102 to protect the pump 116 from damage due to dry pumping. Accordingly, the first level sensor 126 (e.g., float sensor, optical sensor, ultrasonic sensor, etc.) may automatically trigger the shut off the pump 116 even if electrical power is available from the power source 124. Thus, the tank 102 may be considered by the first level sensor 128 as "empty" even if there is the predetermined volume of water in the tank 102. Moreover, the tank 102 may also be provided with a similar second level sensor 128 (e.g., float sensor, optical sensor, ultrasonic sensor, etc.) that determines whether the tank has been filled to a predetermined level that is considered "full" (e.g., 95% of tank volume, 98% of tank volume, etc.). Thus, the second level sensor 128 may automatically trigger the shut off of the valve 134 to prevent inflow water into the tank 102. The sensors 126-128 may be further configured to transmit water volume data of the tank 102 to one or more entities, such as the energy distribution computer 146 of the power source 124 or the power user 144, as well as powered by the power source 124, via one or more electrical and data cables (not shown).

In some embodiments, the tank 102 may be sealed from the surrounding environment. Thus, in such embodiments, the gas portion 112 may include dissolved gases from the water portion 114 coming out of solution, and/or water from the water portion 114 spontaneously converting to a gaseous state. In other embodiments, the tank 102 may include a vent tube 148 that reaches above the upper surface 106 of the water 104 into the atmosphere 106. In such embodiments, the vent tube 148 may enable the gas portion 112 to remain at atmospheric pressure while expanding or contracting in response to change in the volume of the water portion 114.

In various embodiments, a throttling gas valve 162 may be disposed on the vent tube 148 to control the ingress and/or the egress of gas from the vent tube 148. The throttling gas valve 162 may be located on a portion of the vent tube 148 that is exposed to the atmosphere 108. Alternatively, the throttling gas valve 162 may be located on a portion of the vent tube 148 that is submerged in the body of water 104. In the various embodiments, the throttling gas valve 162 may include a gas pressure sensor.

The throttling gas valve 162 may regulate the pressure of the gas portion 112, and indirectly, the hydrostatic pressure of the water portion 114, so that the optimized performance of the turbine 136 is maintained. In other words, since the pitch angle of the blades of the turbine 136 may be customized for optimal operation under a particular hydrostatic pressure, the throttling gas valve 162 may facilitate the maintenance of that particular hydrostatic pressure. In some embodiments, the throttling gas valve 162 may automatically open to vent gas from the tank 102 when the sensed pressure of the gas portion 112 is above a predetermined pressure threshold (e.g., approximately 1.5 atm). Conversely, the throttling gas valve 162 may automatically close when the sensed pressure of the gas portion 112 is below the predetermined pressure threshold. In alternative embodiments, the opening and closing of the throttling gas valve 162 may be controlled by the energy distribution computer 146 based on sensed data from the throttling gas valve 162.

The tank 102 may be anchored to the bottom 110 by one or more flexible members 150 (e.g., cables) that are held in place by one or more weights 152. The use of flexible members 150 and weights 152 may enable the underwater pumped-hydro energy storage unit 100 to be rapidly deployed or repositioned. The one or more flexible members 150 and the one or more weights 152 may serve to maintain the tank 102 and the turbine 136 at a predetermined depth. In this way, the blades of the turbine 136 may receive hydrostatic pressure that optimizes or maximizes power generation efficiency. Further, the use of flexible members 150 may enable the depth of the tank 102 to be adjusted. For example, cables may be shortened to bring the tank 102 to a deeper depth if the volume of water in the body of water 104 significantly decreases. In this way, the hydrostatic pressure on the blades of the turbine 136 may be maintained.

The tank 102 may be further connected by one or more flexible members 154 to one or more buoyant containers 156 (e.g., gas buoy). The one or more buoyant containers 156 may be configured to ensure that there is sufficient upward buoyancy force on the tank 102 to keep the flexible members 150 taut under all operating conditions. In this way, the one or more buoyant containers 156 may also serve to maintain the tank 102 and the turbine 136 at the proper operating depth even when changes in the water portion 114 affects the weight and buoyancy of the tank 102.

Nevertheless, in alternative embodiments, the tank 102 may be anchored to the bottom 110 by one or more rigid members 158. In some of such embodiments, the one or more rigid members 158 may be attached to one or more weights, such as weight 152. In other of such embodiments, the one or more rigid members 158 may be fastened to the bottom 110 with mechanical or chemical fasteners (e.g., anchored to bedrock with bolts). In some of these embodiments, the one or more rigid members 158 may be part of an existing man-made underwater structure (e.g., support column of a bridge, an existing ocean-borne oil platform, etc.).

In such alternative embodiments, the rigid members 158 (e.g., steel stanchions) may be configured to support the weight of the tank 102 under all operating conditions, as well as maintain the tank 102 at the proper depth for the operation of the turbine 136. In some of these embodiments, each rigid member 158 may be further provided with an extension mechanism 160 (e.g., pneumatic pistons, hydraulic pistons, manually operated or motorized jack screw, and/or the like) that enables adjustment to the length of each rigid member. Accordingly, such rigid members may enable the underwater pumped-hydro unit 100 to adapt to different operation conditions. For example, the turbine 136 may be replaced with a different turbine that operates more efficiently at a different depth. In another example, the body of water 104 may experience a loss of volume that changes the hydrostatic pressure on the turbine 136. In such examples, one or more rigid members with adjustment mechanisms may enable the tank 102 and the turbine 136 to be deployed to different depths for maximum operating efficiency.

In still other embodiments, the tank 102 may be constructed from one or more materials (e.g., concrete, steel, etc.) that have sufficient weight and/or density to maintain the tank 102 on the bottom 110 under all operating conditions. In other words, the tank 102 may be configured to possess negative buoyancy in the body of water 104, despite the fact that the tank 102 may be filled with different volumes of gas portion 112 and/or water portion 114.

While the underwater hydro-pumped energy storage unit 100 is illustrated with a tank 102 that is equipped with a single turbine power unit 130 at a single inlet 132, the tank 102 may be equipped with a plurality of inlets 132 and corresponding turbine power units 130 in other embodiments. In some these embodiments, the plurality of turbine power units 130 may be disposed at substantially the same vertical height on the tank 102 (e.g., on the top of the tank 102. Accordingly, each of the turbine power units 130 may be equipped with turbines 136 that have substantially identical blade pitch angles. In other embodiments, each of the plurality of turbine power units 130 may be disposed at different heights on the tank 102. Thus, one or more of turbine power units 130 in such embodiments may be equipped with turbines 136 that have different blade pitch angles. Moreover, while the tank 102 is illustrated with a single pump 116, the tank 102 may also be provided with a plurality of pumps 116 at corresponding outlets. In such embodiments, the plurality of pumps 116 may be disposed at a substantially identical vertical height (e.g., lowest points) on the tank 102. In other embodiments, the plurality of pumps 116 may be provided at outlets of different vertical height on the tank 102.

Figure 2:
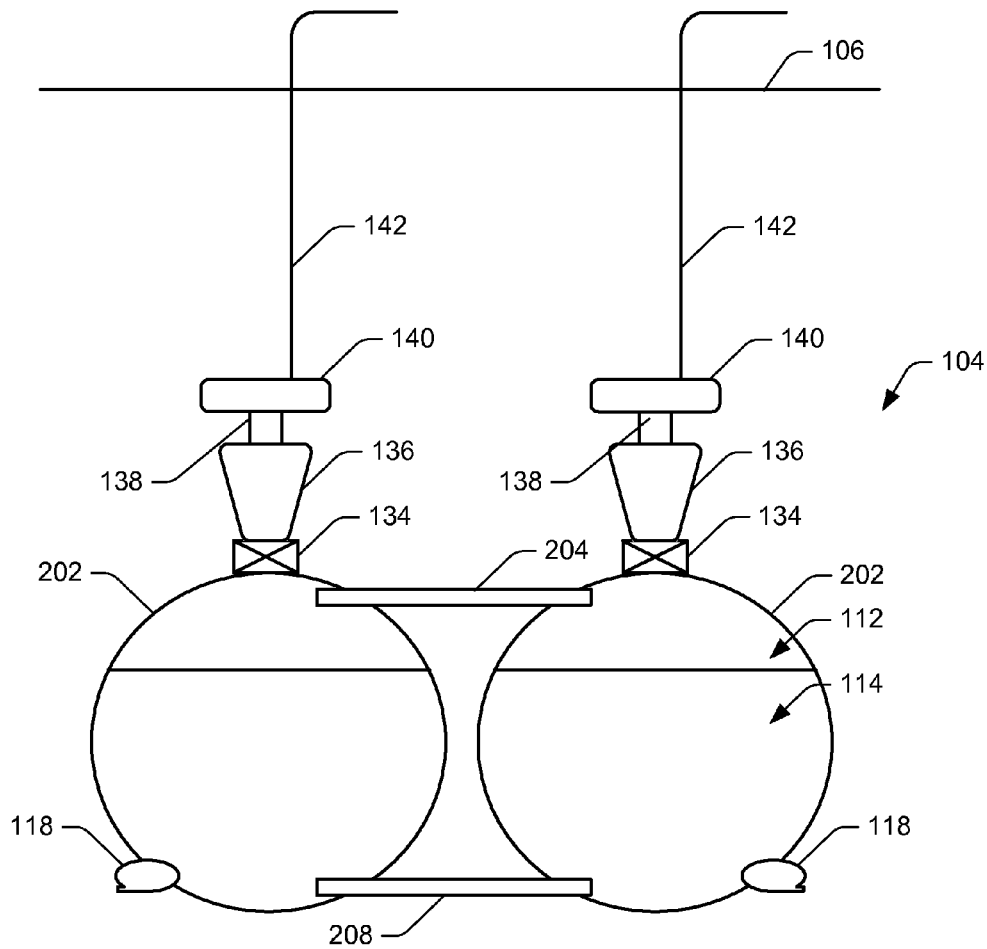
FIG. 2 is a side view of a multi-reservoir version of the example underwater pumped-hydro energy storage unit, in accordance with various embodiments.

FIG. 2 is a side view of a multi-reservoir version 200 of the example underwater pumped-hydro energy storage unit 100, in accordance with various embodiments. The underwater pumped-hydro energy storage unit 200 may include a plurality of tanks 202. Similar to the pumped-hydro energy storage unit 100 described in FIG. 2, at least one of the tanks 202 may be equipped with the pump 116. Likewise, at least one of the tanks 202 may be equipped with one or more turbine power unit 130 at correspond inlets. As described in FIG. 1, each of the turbine power unit 130 may include a valve 134 that controls the flow of water into the tank 202 through a turbine 136. In turn, turbine 136 may be connected by a shaft 138 to an electrical generator 140. In some embodiments, the electrical power generated by the electrical generator 140 may be transmitted via an electrical cable 142 to an electrical grid of a power user 150.

Each of the plurality of tanks 202 may be connected to one or more other tanks 202 by one or more vapor lines 204 and the one or more water lines 208. In various embodiments, the one or more vapor lines 204 may convey gas 206 between the tanks 202, and the one or more water lines 208 may convey water 210 between the tanks 202. However, in some embodiments, a vapor line 204 may also convey water 210 between two tanks 202 when the level of the water 210 reaches the vapor line 204 (e.g., in case of obstruction of a corresponding water line 84). In this way, the one or more vapor lines 204 and the one or more water lines 208 may serve to ensure that the gas 204 and the water 210 are distributed among the plurality of tanks 202 in a substantially equal manner in all circumstances. Such circumstances including when not all of the tanks 202 of the tanks are equipped with turbine power units 130, or when not all of the turbines power units 130 are generating electrical power from the passage water.

Figure 3:
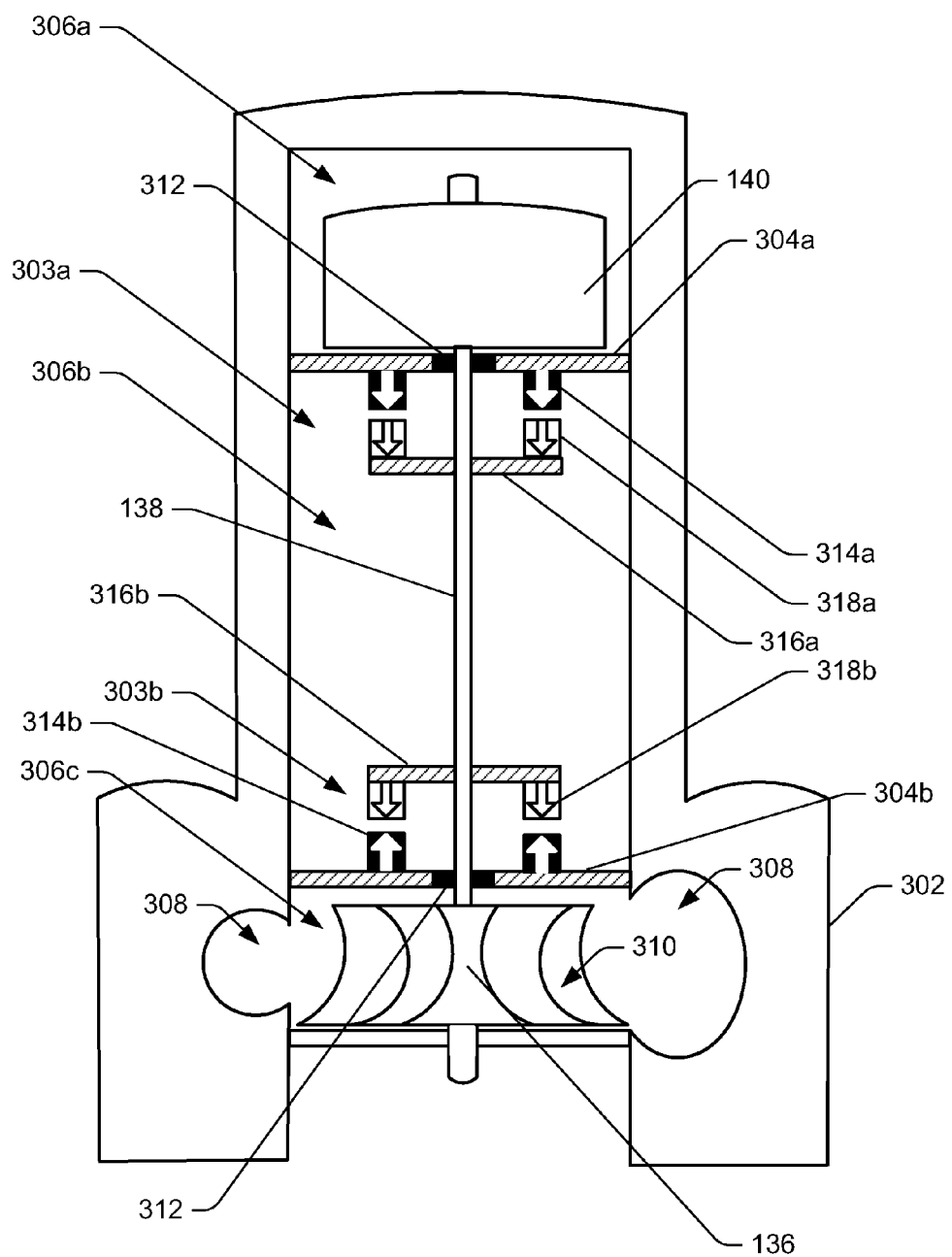
FIG. 3 is a side view of an illustrative turbine generator of the example underwater pumped-hydro energy storage unit, in accordance with various embodiments.

FIG. 3 is a side view of an illustrative turbine generator 300 of the example underwater pumped-hydro energy storage unit 100, in accordance with various embodiments. The turbine generator 300 may be disposed on a tank inlet of an underwater pumped-hydro energy storage unit (e.g., tank 102) so that the turbine generator 300 generates power from the flow of water into the tank. The components of the turbine 300 may be enclosed in a housing 302. The housing 302 may include internal structural members 304a and 304b that divide the housing 302 into an upper portion 306a, a middle portion 306b, and a lower portion 306c. The lower portion 306c may include a passage 308 that enables the flow of water onto the turbine blades 310 of the turbine 136, and exit into an air portion (e.g., air portion 112) of a tank (e.g., tank 102). The turbine 136 may be connected to the lower end of a vertical shaft 138 that penetrates the internal structure members 304a and 304b. The upper end of the shaft 138 may be connected to a generator 140 that is located in the upper portion 306a of the housing 302. The generator 140 may generate electrical power from the force exerted on to the turbine 136 by the flow of water. In various embodiments, each of the internal structure members 306a and 306b may include mechanical bearing 312 that position the shaft 138 within each structure member. The mechanical bearings 312 may enable the shaft 138 to freely rotate but do not allow the shaft 138 to move horizontally or vertically.

In various embodiments, a permanent magnet stator may be attached to each structural member. As shown, a permanent magnet stator 314a may be attached to structural member 304a. Likewise, a permanent magnet stator 314b may be attached to structural member 304b. In at least one embodiment, each of the permanent magnet stators 314a and 314b may be in the form of a ring. Moreover, holding disks 316a and 316b may be attached to the shaft 138 in the middle portion 306b of the housing 302. A permanent magnet rotor element may be attached to each of the holding disk. As shown, permanent magnet rotor element 318a may be attached to disk 316a. Likewise, permanent magnet rotor element 318b may be attached to holding disk 316b. In at least one embodiment, each of the permanent magnet rotors 318a and 318b may also take the form of a ring.

As shown in FIG. 3, a lower magnetic bearing 303a may be formed by a first pairing of the permanent magnet stator 314a and the corresponding permanent magnet rotor 318a. Likewise, an upper magnetic bearing 303b may be formed by a second pairing of the second permanent magnet stator 314b and the corresponding permanent magnet rotor 318b. The magnet polarity of each magnetic component is illustrated in FIG. 3 by an arrow. As shown by arrows, in the lower magnetic bearing 303a, the magnetic polarities are such that there is a mutual magnetic repulsion between the stator 314a and the rotor 318a. In the upper magnetic bearing 303b, the magnetic polarities are such that there is a mutual magnetic attraction between the stator 314b and the rotor 318b. The magnetic components may be azimuthally homogeneous, so that each of holding disks 316a and 316b may be free to rotate about an axis of symmetry defined by shaft 138. In alternative embodiments, the permanent magnet rotor elements 318a and 318b may be replaced with a single permanent rotor element, with a correspondingly shorter shaft 138. Thus, in such alternative embodiments, the permanent magnet stators 314a and 314b may act on the same magnet rotor element.

In other embodiments, additional sets of magnetic bearings may be positioned in the housing 136 via the placement of additional internal structural elements and corresponding holding disks into the housing 136. Accordingly, the turbine generator 300 may include one or more magnetic bearings, wherein each of the magnetic bearings may include mutually repulsive magnetic components, or mutually attractive magnet components.

In various embodiments, the gaps between the components (e.g., permanent magnet stator 314a and permanent magnet rotor 318a) in each of the one or more magnetic bearings may be set so that the weight of the turbine 136, the shaft 138, one or more rotors of the generator 140, and/or the weight of the incoming water on the turbine blades 310 are substantially supported, that is, countered against gravity, by magnetic interaction. Thus, the magnetic bearings may increase the efficiency of the turbine generator 300 by decreasing friction and/or eliminating contact surfaces. The magnetic bearing any also reduce the complexity of the turbine by eliminating components that keep conventional bearings lubricated.

Figure 4:
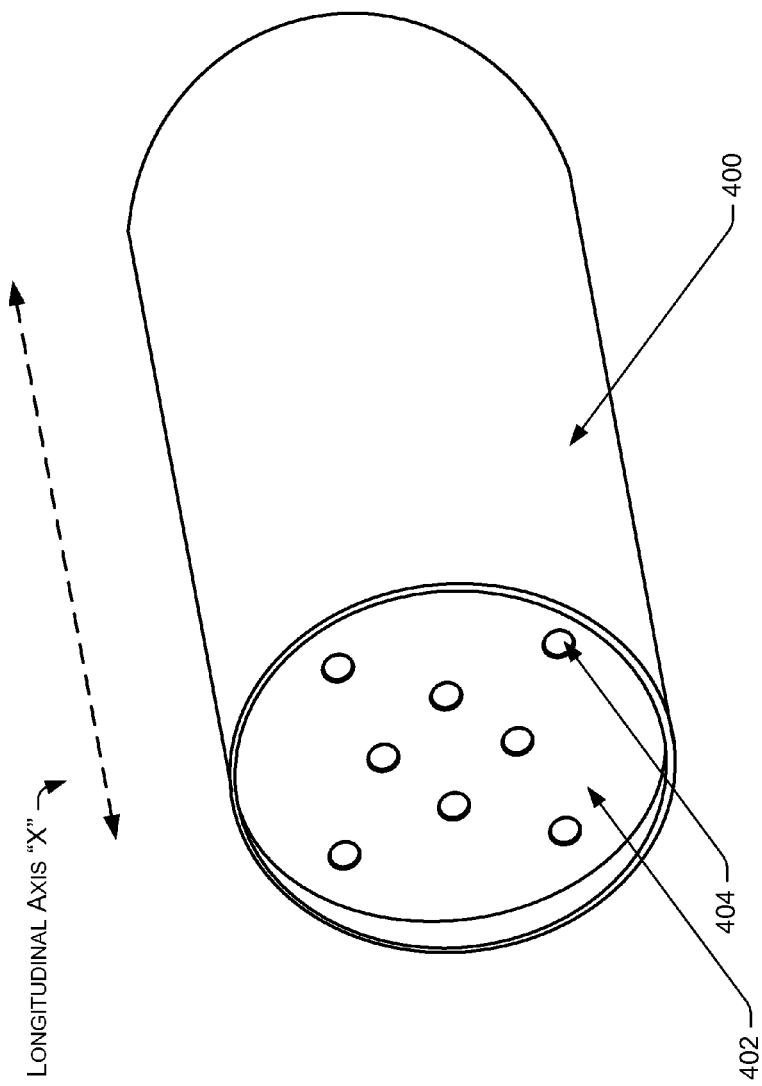
FIG. 4 is a sectioned isometric view of a storage reservoir of the example underwater pumped-hydro energy storage unit, in accordance with various embodiments.

FIG. 4 is a sectioned isometric view of a storage tank 400 of the example underwater pumped-hydro energy storage unit 100, in accordance with various embodiments. The storage tank 400 may include one or more internal walls 402 to provide mechanical strength and prevent bucking under the hydrostatic pressure on the outside of the tank 400. Each of the internal walls 402 may have at least one perforation 404 to enable the flow of water and/or gas between compartments that are otherwise separated by the internal walls 402. In various embodiments, each of the walls 402 may be either substantially traverse or substantially parallel to a longitudinal axis "X" of the tank 400. It will be appreciated that while tank 400 is illustrated in FIG. 4 as substantially cylindrical in shape, tank 400 may have other shapes in various embodiments (e.g., spherical, cubical, etc.), provided that the design of the tank is capable of withstanding the hydrostatic pressure at the desired operating depth.

In various embodiments, the tank 400 may be made on shore, on the water surface, or in the water. In at least one embodiment, the tank 400 may be manufactured on shore or near the shore and towed to its desired location. Accordingly, multiple tanks may be assembled and connected in the field.

Figure 5:
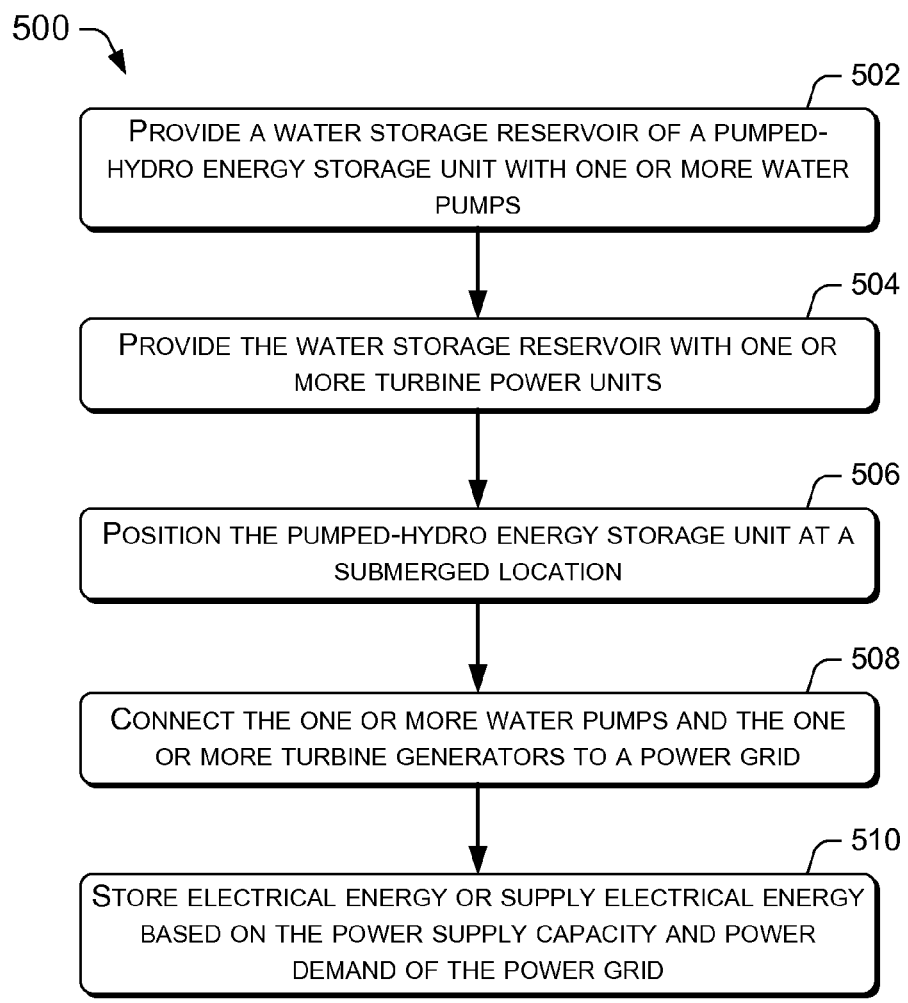
FIG. 5 is a flow diagram illustrating an example process for deploying the example underwater pumped-hydro energy storage unit illustrated in FIGS. 1-4 to store and output energy, in accordance with various embodiments.

FIG. 5 is a flow diagram illustrating an example process 500 for deploying example underwater pumped-hydro energy storage unit illustrated in FIGS. 1-4 to store and output energy, in accordance with various embodiments. The order in which the operations are described in the process 500 is not intended to be construed as a limitation, and any number of the described blocks can be combined in any order and/or in parallel to implement the process.

At block 502, a water storage reservoir may be provided with one or more water evacuation pumps (e.g., pump 116) during assembly into an underwater pumped-hydro energy storage unit. In various embodiments, the water storage reservoir may include one or more tanks (e.g., tank 102). The one or more water evacuation pumps may be attached at corresponding outlets of the water storage reservoir to evacuate water from the one or more tanks.

At block 504, the water storage reservoir may be provided with one or more turbine power units (e.g., turbine power units 130) during assembly into the underwater pumped-hydro energy storage unit. In various embodiments, the turbine power units may be attached at corresponding inlets of the water storage reservoir to generate power from the flow of water into the one or more tanks.

At block 506, the underwater pumped-hydro energy storage unit may be positioned at a submerged location. In various embodiments, the underwater pumped-hydro energy storage unit may be anchored to the bottom 110 of a body of water 104 via one or more flexible and/or rigid members. The underwater pumped-hydro energy storage unit may be deployed at a depth of the body of water 104 that enables the one or more turbine power units to efficiently produce electrical power.

In embodiments where the underwater pumped-hydro energy storage unit includes a plurality of tanks, the positioning may include connection of the tanks via the one or more vapor lines 204 and the one or more water lines 208. In other embodiments, the water storage reservoir of the underwater pumped-hydro energy storage unit may be positioned at the submerged location, and the one or more water evacuation pumps and one or more turbine power units attached following the placement of the underwater pumped-hydro energy storage unit.

At block 508, the one or more water evacuation pumps and the one or more turbine generators of the underwater pumped-hydro energy storage unit may be attached to a power grid.

At block 510, the underwater pumped-hydro energy storage unit may alternatively store electrical power from the power grid and provide electrical power to the electrical grid, depending on the power capacity of the power grid. In some embodiments, the power grid may be serviced by a power utility. In other embodiments, the under underwater pumped-hydro energy storage unit may be connected via a power grid one or more energy generators (e.g., wind power generator, wave power generator, solar power generator) of a self-contained power generation and distribution mechanism of a self-sufficient entity (e.g., ocean-borne oil platform). Accordingly, the underwater pumped-hydro energy storage unit may alternative store surplus power generated, and return power to the power utility on demand.

Figure 6:
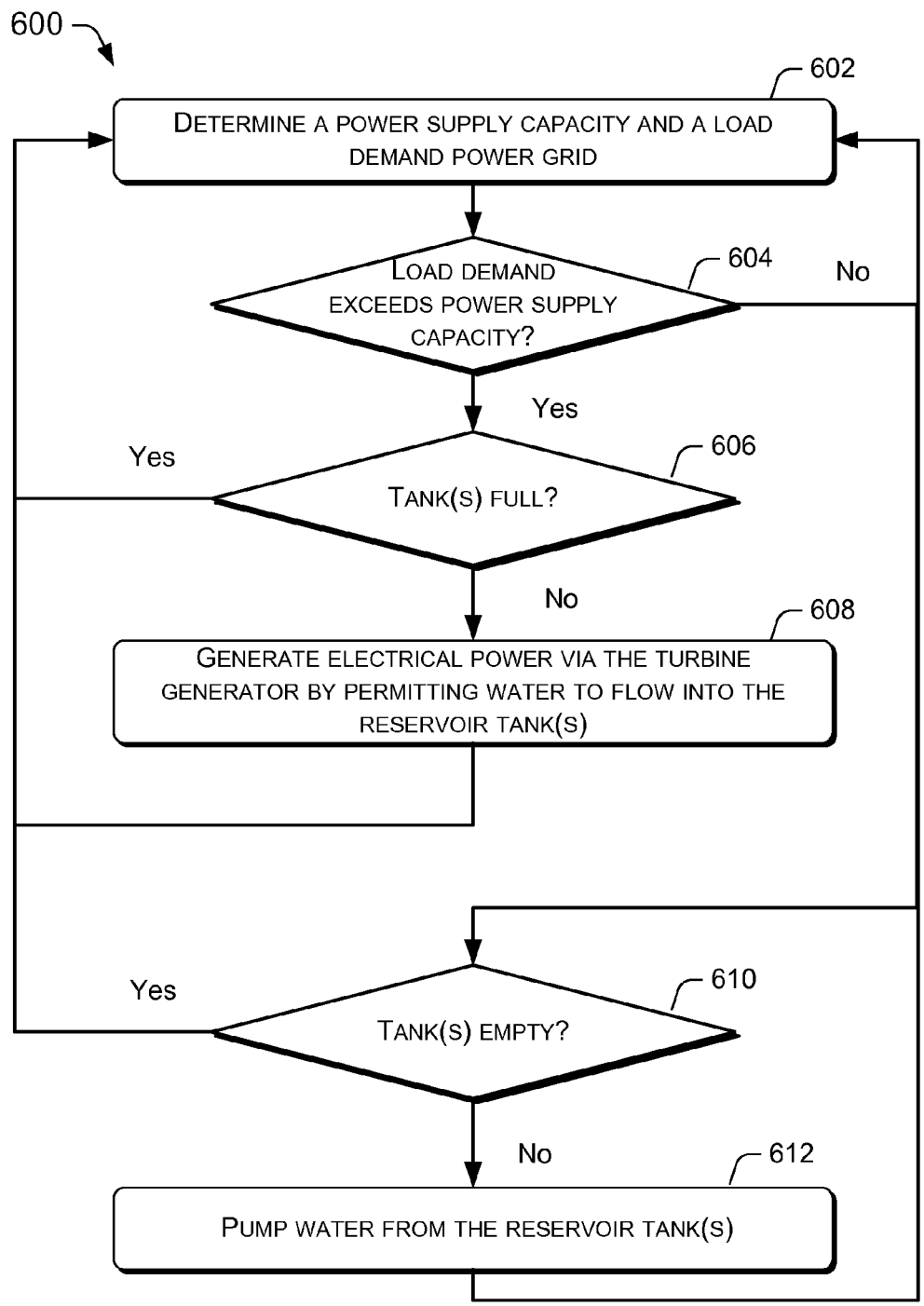
FIG. 6 is a flow diagram illustrating an example process for operating the example under pumped-hydro energy storage unit illustrated in FIGS. 1-4 based on a power supply capacity, in accordance with various embodiments.

FIG. 6 is a flow diagram illustrating an example process 600 for operating the example under pumped-hydro energy storage unit illustrated in FIGS. 1-4 based on a power supply capacity, in accordance with various embodiments. The order in which the operations are described in the process 600 is not intended to be construed as a limitation, and any number of the described blocks can be combined in any order and/or in parallel to implement the process.

At block 602, an energy distribution computer 146 of a power source 124 and/or power user 144 may determine the power supply capacity and load demand of a power grid. The power grid may service the power source 124 and the power user 144.

At decision block 604, if the energy distribution computer 146 determines that the load demand of the power user 144 exceeds the power supply capacity of the power source 124 ("yes" at decision block 604), the process 600 may proceed to decision block 606.

At decision block 606, the energy distribution computer 146 may determine whether the one or more reservoir tanks (e.g., tank 102) of the underwater pumped-hydro energy storage unit are full. In various embodiments, the energy distribution computer 146 may this determination based water volume (level) sensor data from the one or more reservoir tanks. If the energy distribution computer 146 determines that the one or more reservoir tanks are full ("yes" at decision block 606), the process 600 may loop back to block 602, at which point the energy distribution computer 146 may continuous monitor the power grid.

However, if the energy distribution computer 146 determines that the one or more reservoir tanks are not full ("no" at decision block 604), the process 600 may proceed to block 608.

At block 608, the energy distribution computer 146 may direct an underwater pumped-hydro energy storage unit (e.g., unit 100) to generate electrical power by permitting water to travel to the one or more reservoir tanks past one or more turbine power units (e.g., turbine power unit 130). In various embodiments, the energy distribution computer 146 may direct a valve (e.g., valve 134) at each of the one or more reservoir tanks to permit water to travel through a corresponding turbine power unit via a command signal. The generated electrical power may be provided to the power user 144 via the power grid. Following the initiation of electrical power generation, the energy distribution computer 146 may continuously monitor the power grid. In other words, process 600 may loop back to block 602.

However, returning to decision block 604, if the energy distribution computer 146 determines that the load demand of the power source 124 does not exceed the power supply capacity of the power source 124 ("no" at decision block 604), the process 600 may proceed to decision block 610.

At decision block 610, the energy distribution computer 146 may determine whether the one or more reservoir tanks (e.g., tank 102) of the underwater pumped-hydro energy storage unit are empty. In various embodiments, the energy distribution computer 146 may this determination based water volume (level) sensor data from the one or more reservoir tanks. If the energy distribution computer 146 determines that the one or more reservoir tanks are empty ("yes" at decision block 610), the process 600 may loop back to block 602, at which point the energy distribution computer 146 may continuous monitor the power grid.

However, if the energy distribution computer 146 determines that the one or more reservoir tanks are not empty ("no" at decision block 610), the process 600 may proceed to block 612.

At block 612, the energy distribution computer 146 may direct the underwater pumped-hydro energy storage unit to store energy by pumping water out of its one or more reservoir tanks (e.g., tank 102) via one or more pumps 116. Following the initiation of the pumping, the energy distribution computer 146 may continuously monitor the power grid. In other words, process 600 may loop back to block 602, at which point the energy distribution computer 146 may continuous monitor the power grid.

It will be appreciated that in other embodiments, the power generation or the power distribution describe in one or more blocks of the process 600 may also be controlled manually by an operator of the energy distribution computer 146 based on sensor data.

Embodiments of systems and methods in accordance with the present disclosure may provide significant advantages. The embodiments of the underwater pumped-hydro energy storage units may provide an efficient and economical way for power utilities to store excessive electricity that are generated during low demand periods, as well as supplement electricity generation capacity for use during peak loads. Accordingly, power utilities may avoid the financial, social, and environmental costs associated with building new power generation plants and support infrastructures.

While embodiments have been illustrated and described above, many changes can be made without departing from the spirit and scope of the disclosure. Accordingly, the scopes of the embodiments are not limited by the disclosure. Instead, the embodiments of the disclosure should be determined entirely by reference to the claims that follow.

What is claimed is:

1. An underwater pumped-hydro energy storage device, comprising:
    at least one submersible tank that includes an inlet and an outlet;
    a pump disposed at the outlet of the at least one submersible tank to evacuate water from the submersible tank;
    a valve disposed at the inlet of the at least one submersible tank to control a flow of water into the at least one submersible tank from a surrounding body of water; and
    a turbine power unit to generate output electrical power from the flow of water into the at least one submersible tank, wherein the turbine is designed to operate at first hydrostatic pressure; and
    a gas vent attached to the at least one submersible tank, the gas vent to enable gas to flow into or out of the at least one submersible tank, wherein the gas vent includes a throttling gas valve which opens and closes automatically to regulate the flow of the gas into or out of the at least submersible tank to maintain a hydrostatic pressure between a first threshold which is less than the first hydrostatic pressure and a second threshold which is greater than the first hydrostatic pressure.

2. The device of claim 1, wherein the at least one submersible tank includes one or more internal walls, each of the internal walls being substantially parallel or substantially transverse to a longitudinal axis of the at least one submersible tank and including at least one perforation for passage of gas or water.

3. The device of claim 1, wherein the at least one submersible tank has negative buoyancy that maintains the at least one submersible tank on a bottom of the body of water.

4. The device of claim 1, further comprising a plurality of submersible tanks, wherein the plurality of submersible tanks are connected by at least one vapor line that enables passage of gas between the plurality of submersible tanks, and at least one water line that enables passage of water between the plurality of submersible tanks.

5. The device of claim 1, further comprising at least one flexible or rigid member to anchor the at least one submersible tank to a bottom of the body of water.

6. The device of claim 5, further comprising one or more gas containers attached to the at least one submersible tank to counteract varied weight of water inside the at least one submersible tank to keep the at least one flexible member taut.

7. The device of claim 5, wherein the rigid member includes an extension mechanism that enables the turbine power unit to be deployed to a predetermined depth, and wherein the turbine power unit includes a turbine with a plurality of turbine blades, each of a plurality of turbine blades having a pitch angle that is customized for electrical power generation from a hydrostatic pressure at the predetermined depth.

8. The device of claim 1, further comprising a power cable to convey input electrical power to operate the pump from a power grid or convey the output electrical power from the turbine power unit to the power grid.

9. The device of claim 1, wherein the turbine power unit includes one or more magnetic bearings that support weight of at least one of a shaft, a turbine, a rotor part of a generator, or water flowing on one or more turbine blades of a turbine in the turbine power unit.

10. The device of claim 9, wherein the one or more magnetic bearings includes a permanent magnetic stator and a permanent magnetic rotor that are one of mutually repulsive or mutually attractive.

* * * * *